United States Patent [19]
Shigemori

[11] Patent Number: 5,272,686
[45] Date of Patent: Dec. 21, 1993

[54] SERVO SIGNAL GENERATOR FOR OPTICAL DISK DRIVING APPARATUS

[75] Inventor: Toshihiro Shigemori, Yokohama, Japan

[73] Assignee: Ricoh Company, Ltd., Tokyo, Japan

[21] Appl. No.: 846,472

[22] Filed: Mar. 5, 1992

Related U.S. Application Data

[63] Continuation-in-part of Ser. No. 434,081, Nov. 9, 1989, abandoned.

[30] Foreign Application Priority Data

Nov. 14, 1988 [JP] Japan .................. 63-287242

[51] Int. Cl.⁵ .................................................. G11B 7/00
[52] U.S. Cl. ........................... 369/44.26; 369/44.34
[58] Field of Search ............... 369/44.11, 44.26, 44.28, 369/44.29, 44.34, 44.31, 44.41, 44.42

[56] References Cited

U.S. PATENT DOCUMENTS

| | | | |
|---|---|---|---|
| 4,467,462 | 8/1984 | Shibata | 369/44.41 |
| 4,562,564 | 12/1985 | Bricot et al. | 369/44 |
| 4,779,251 | 10/1988 | Burroughs | 369/44.26 |
| 4,779,253 | 10/1988 | Getreuer et al | 369/44.29 |
| 4,855,983 | 8/1989 | Arai | 369/44.34 |
| 4,933,922 | 6/1990 | Yokogawa | 369/44.34 |
| 4,951,275 | 8/1990 | Saitoh et al. | 369/44.34 |
| 4,967,403 | 10/1990 | Ogawa et al. | 369/44.26 |
| 5,079,756 | 1/1992 | Kuwabara | 369/44.27 |

FOREIGN PATENT DOCUMENTS

| | | | |
|---|---|---|---|
| 2612328 | 9/1988 | France | 369/44.26 |
| 90035 | 10/1988 | Japan | |
| 64-13233 | 1/1989 | Japan | |

OTHER PUBLICATIONS

T. Takeuchi, et al., "Clock Jitter in Sampled Servo Format," International Symposium on Optical Memory 1987 Technical Digest, p. 137.

*Primary Examiner*—Donald E. McElheny, Jr.
*Attorney, Agent, or Firm*—Cooper & Dunham

[57] ABSTRACT

An optical disk driving apparatus for driving an optical disk which comprises annular tracks having a data area and a servo area. Center servo data pits are disposed on and along a track center. First offset servo data pits are disposed on one side of the track center. Second offset servo data pits are disposed on the other side of the track center. Each of the first and second pits is offset by a predetermined length away from the track center. The apparatus comprises a servo signal generator for detecting the pits using an optical spot and generating servo signals corresponding to the pits. The apparatus also comprises a detector for obtaining a tracking signal by subtracting the servo signals for the first and second pits. The apparatus further comprises a first comparator for comparing the servo signals for the center pits and the first pits, a second comparator for comparing the servo signals for the center pits and the second pits and a detector for detecting the misalignment of the optical spot with the track center by using outputs of the first and second comparators.

8 Claims, 11 Drawing Sheets

SERVO SIGNAL GENERATOR FOR OPTICAL DISK DRIVING APPARATUS

CROSS REFERENCE TO RELATED APPLICATION

This is a continuation-in-part application of patent application Ser. No. 434,081 filed on Nov. 9, 1989, abandoned.

BACKGROUND OF THE INVENTION

The present invention relates to a servo signal generator for an optical disk driving apparatus.

Japanese Patent Application Laying Open (KOKAI) No. 63-90035 discloses an optical disk driving apparatus which comprises a so-called sample-servo type optical disk and a tracking signal detection means.

The known sample-servo type optical disk has concentric circular or spiral tracks on which a data area for recording information and a servo area for positioning or seeking the track are arranged. In the servo area, a plurality of central data servo pits are formed on and along the center line of the track. In the servo area are also formed a plurality of first offset servo data pits and second offset servo data pits which are offset from the center line of the track. The first offset servo data pits are disposed on one side of the center line of the track while the second offset servo data pits are disposed on the other side of the center line of the track.

The above-mentioned tracking signal detection means comprises a quarter division optical detector which divides rays reflected from the optical disk surface to four parts and detects the reflected rays of each of the four parts and an adder circuit which adds the detection signal from each of the divided parts in a predetermined way to obtain a reading signal.

When a reading laser beam spot scans on and along the center line of the track, the levels of the reading signals from the first and second offset servo data pits are the same since the distance from the spot point to each of the first pits is the same as that from the spot point to each of the second pits. Whereas when the reading laser beam spot scans on and along a line offset from the center line, the level of the reading signal from the first offset servo data pits is not equal to that from the second offset servo data pits since the distances from the beam spot point to the first and the second offset pits are not the same together.

The reading signal from the adder circuit is transmitted to two sample hold circuits to sample the reading signals from the first and second offset servo data pits, respectively. The output signals from the two sample hold circuits are transmitted to a subtracter circuit to obtain a tracking signal in response to the difference between the output signals from the two sample hold circuits.

Also, in general, the beam spot is checked to determine whether the scanning line is aligned with the track center so that the beam spot accurately follows the track when the spot scans the track for reading or writing information from or to the track. Such a check of track misalignment is necessary to avoid misreading or miswriting of information due to misalignment of the scanning line with the track.

In accordance with a conventional track misalignment detection circuit, a window comparator comprising two comparators and an OR circuit is used to detect the above-mentioned track misalignment of the optical spot by checking whether the tracking signal is more than an upper threshold level determined by a power source or less than a lower threshold level. The OR circuit outputs a track misalignment signal when the tracking signal exceeds the upper threshold level or becomes less than the lower threshold level. The track misalignment signal is not output from the OR circuit when the tracking signal is between the upper and lower threshold levels.

However, in accordance with the conventional optical disk driving apparatus using the above-mentioned track misalignment detection circuit, the amplitude of the tracking signal changes according to the reflection factor of the optical disk so that the distance between the optical spot and the track center is detected improperly since the distance corresponds to the amplitude of the tracking signal. This causes problems that a track misalignment signal is mistakenly generated from the detection circuit although the misalignment amount is negligible or to the contrary the track misalignment signal is not generated although the optical spot is not aligned with the track center. Such problems further result in that it becomes impossible to read or write information from or to the right track or that recorded information is mistakenly erased by miswriting information to a wrong track.

SUMMARY OF THE INVENTION

It is therefore an object of the present invention to provide an optical disk driving apparatus in which the above-mentioned problems are attenuated so that the track misalignment is reliably detected irrespective of fluctuation of the tracking signal due to unstable reflection of the optical disk or other causes.

The object of the invention can be achieved by an optical disk driving apparatus for driving an optical disk which comprises: substantially annular tracks for recording information; a data area disposed in the track; a servo area disposed in the track apart from the data area; a plurality of center servo data pits disposed on and along a center of the track; a plurality of first offset servo data pits disposed on one side of the center of the track; and a plurality of second offset servo data pits disposed on the other side of the center of the track, each of the first and second offset servo data pits being offset by a predetermined length away from the center of the track, wherein the apparatus comprises: a reading means for detecting the center servo data pits, the first offset servo data pits and the second offset servo data pits, respectively, by an optical spot and generating servo signals in response to detection signals of each of the center, first and second servo data pits, respectively; a tracking signal generating means for obtaining a tracking signal by subtraction between the servo signal for the first offset servo data pits and the servo signal for the second offset servo data pits; a first comparison means for comparing the servo signal for the center servo data pits with the servo signal for the first offset servo data pits; a second comparison means for comparing the servo signal for the center servo data pits with the servo signal for the second offset servo data pits; and a track misalignment detection means for detecting the misalignment of the optical spot with the center of the track in accordance with outputs from the first and second comparison means.

In accordance with the above-mentioned apparatus, a tracking signal is calculated by the tracking signal detection means by subtraction between the servo signals for the first offset servo data pits and the second offset servo data pits. The servo signal for the center servo data pits is compared with the servo signal for the first offset servo data pits by the first comparison means. Also, the servo signal for the center servo data pits is compared with the servo signal for the second offset servo data pits by the second comparison means. A track misalignment signal is calculated and transmitted from the track misalignment detection means on the basis of the outputs from the first and second comparison means.

An advantage of the above-mentioned apparatus is that the misalignment of the optical spot with the center of the track can be reliably detected even if the tracking signal is fluctuated due to changes of the reflection factor of the optical disk, since the apparatus of the present invention is constructed to apply to an optical disk driving apparatus for driving an optical disk which comprises: substantially annular tracks for recording information; a data area disposed in the track; a servo area disposed in the track apart from the data area; a plurality of center servo data pits disposed on and along a center of the track; a plurality of first offset servo data pits disposed on one side of the center of the track; and a plurality of second offset servo data pits disposed on the other side of the center of the track, each of the first and second offset servo data pits being offset by a predetermined length away from the center of the track, wherein the apparatus comprises: a reading means for detecting the center servo data pits, the first offset servo data pits and the second offset servo data pits, respectively, by an optical spot and generating servo signals in response to detection signals of each of the center, first and second servo data pits, respectively; a tracking signal generating means for obtaining a tracking signal by subtraction between the servo signal for the first offset servo data pits and the servo signal for the second offset servo data pits; a first comparison means for comparing the servo signal for the center servo data pits with the servo signal for the first offset servo data pits; a second comparison means for comparing the servo signal for the center servo data pits with the servo signal for the second offset servo data pits; and a track misalignment detection means for detecting the misalignment of the optical spot with the center of the track in accordance with outputs from the first and second comparison means.

Further objects and advantages of the present invention will be apparent from the following description of the preferred embodiments of the invention as illustrated in the accompanying drawings.

DESCRIPTION OF THE PREFERRED EMBODIMENTS

Embodiments of the present invention are described in detail hereinafter with reference to the drawings and in comparison to the conventional related art.

Figure 4:
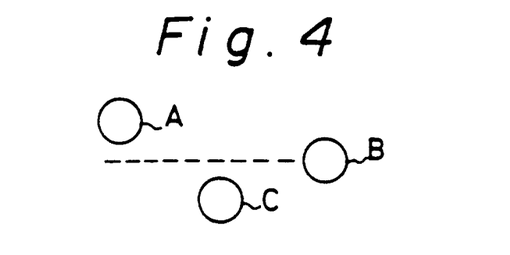
FIG. 4 is a layout diagram representing an example of servo data pits of the optical disk to which the present invention is applied.

FIG. 4 illustrates an enlarged part of a sample servo type optical disk showing a layout of servo data pits disposed on a track of a related art to which the present invention is applied. The known sample-servo type optical disk has concentric circular or spiral tracks on which a data area for recording information and a servo area for positioning or seeking the track are arranged. In the servo area, a plurality of central data servo pits B (only one pit B is illustrated in the drawing) are formed on and along the center line of the track. The center line is represented by a dash line in the drawing. Actually, the center line is a part of a circular arc of the track. In the servo area are also formed a plurality of first offset servo data pits A (only one pit A is illustrated in the drawing) and second offset servo data pits C (only one pit C is illustrated in the drawing). Each of the first and second offset servo data pits A and C is offset from the center line of the track. The first offset servo data pit A is disposed on one side of the center line of the track by a length of one fourth of the track pitch while the second offset servo data pit C is disposed on the other side of the center line of the track by the same length of one fourth of the track pitch as the first offset servo data pit A. The number of each of the servo data pits A, B and C is, for example, 1376 along one round of the track.

Figure 5:
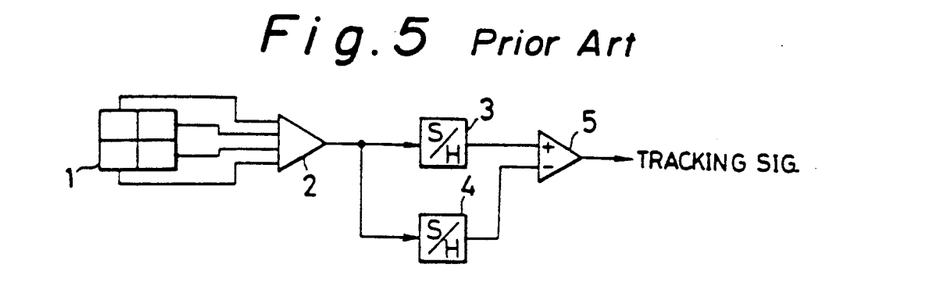
FIG. 5 is a block diagram representing an example of a conventional tracking signal detection circuit.

FIG. 5 illustrates a circuit of a tracking signal detection means applied to the above-mentioned track structure having the servo data pits arranged thereon. The circuit comprises a quarter division optical detector 1 which divides rays reflected from the optical disk surface into four parts and detects the reflected rays of each of the four parts and an adder circuit 2 which adds the detection signal from each of the divided parts in a predetermined way to obtain a reading signal.

Figure 6:
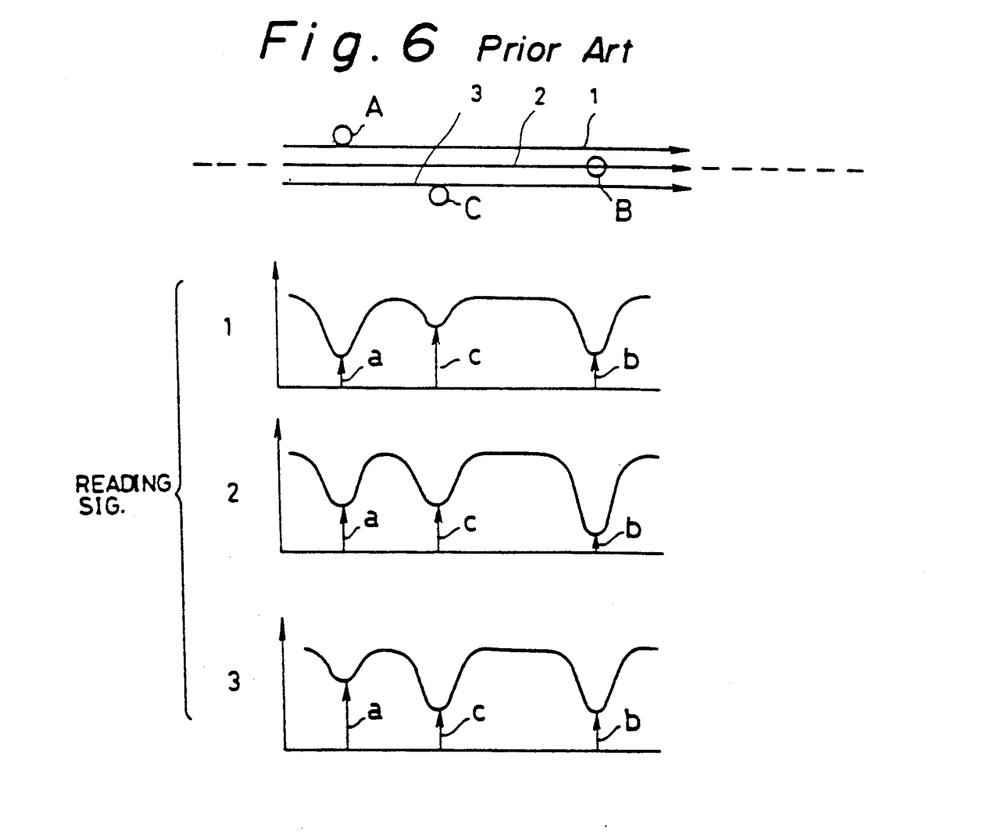
FIG. 6 is an explanatory diagram for explaining reading signals obtained from the optical spot when it passes over the servo data pits of FIG. 4, respectively.

FIG. 6 illustrates graphs of the reading signals when an optical spot such as a laser beam spot passes over the above-mentioned servo data pits A, B and C, respectively. As illustrated in the graph ② of FIG. 6, when the reading laser beam spot scans on and along the center line of the track, the levels of the reading signals (a) and (c) from the first and second offset servo data pits A and C, respectively, are the same since the distance from the spot point (on the track center) to the first pit A is the same as that from the spot point to the second pit C. Whereas, as illustrated in the graphs of ① and ② of FIG. 6, when the reading laser beam spot scans on and along a line offset from the center line, the level of the reading signal (a) from the first offset servo data pit A is not equal to the reading signal (c) from the second offset servo data pit C, since the distance from the beam spot point to the first offset pit A is not the same as that from the beam spot point to the second offset pit C.

As illustrated in FIG. 5, the reading signal from the adder circuit 2 is transmitted to the two sample hold circuits 3 and 4 to sample the reading signals (a) and (c) from the first and second offset servo data pits A and C, respectively. The output signals from the two sample hold circuits 3 and 4 are transmitted to a subtractor circuit 5 to obtain a tracking signal (a-c) in response to the difference between the output signals from the two sample hold circuits 3 and 4.

Also, in general, the beam spot is checked whether the scanning line is aligned with the track center so that the spot accurately follows the track center when the spot scans the track for reading or writing information from or to the track. Such a check of track alignment is necessary to avoid misreading or miswriting of information due to misalignment of the scanning line with the track.

Figure 7:
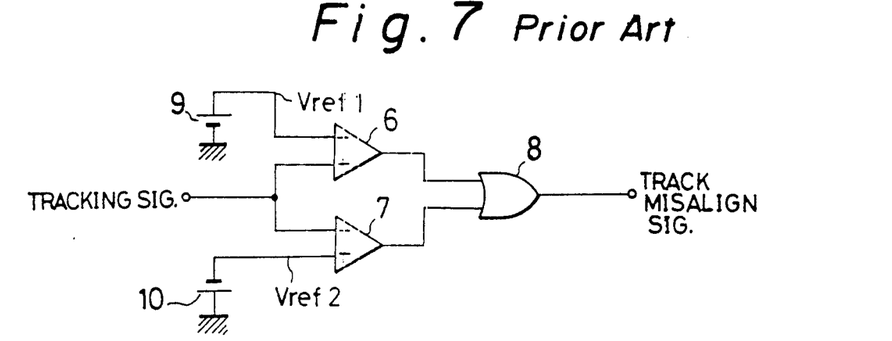
FIG. 7 is a circuit diagram representing a conventional track misalignment detection means.

FIG. 7 illustrates a conventional track misalignment detection circuit in accordance with the related art. The conventional track misalignment detection circuit comprises a window comparator comprising two comparators 6 and 7 and an OR circuit 8 for detecting the above-mentioned track misalignment of the optical spot by checking whether the tracking signal (a-c) mentioned above is more than an upper threshold level Vref1 determined by a power source 9 or less than a lower threshold level Vref2 determined by a power source 10.

Figure 8:
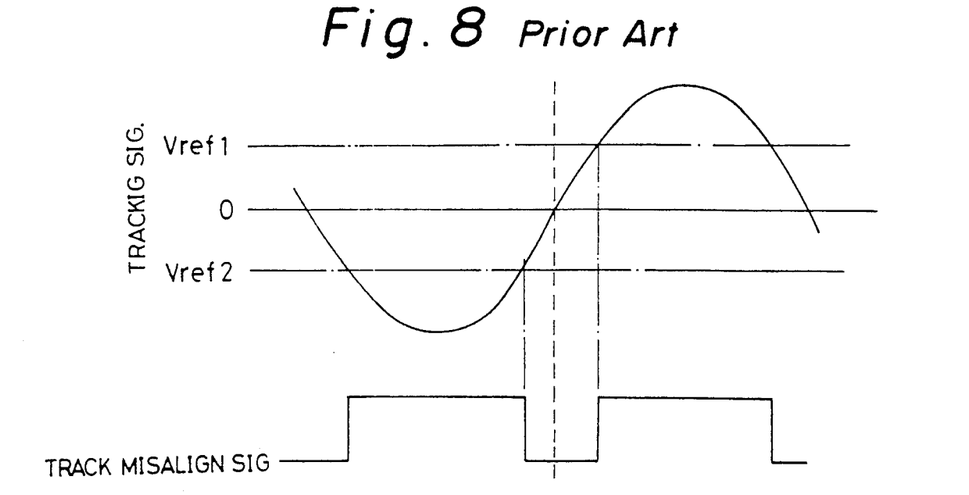
FIG. 8 is an explanatory diagram for explaining the output signal from the track misalignment detection means of FIG. 7.

FIG. 8 illustrates the waveforms of the tracking signal and the track misalignment detection signal in accordance with the above-mentioned track misalignment detection circuit of FIG. 7.

The OR circuit 8 outputs a track misalignment signal when the tracking signal (a-c) exceeds the upper threshold level Vref1 or becomes less than the lower threshold level Vref2. The track misalignment signal is not output from the OR circuit 8 when the tracking signal (a-c) is between the upper and lower threshold levels Vref1 and Vref2.

However, in accordance with the conventional optical disk driving apparatus using the above-mentioned track misalignment detection circuit, the amplitude of the tracking signal changes according to the reflection factor of the optical disk so that the distance between the optical spot and the track center is detected incorrectly since the distance corresponds to the amplitude of the tracking signal. This causes problems in that the track misalignment signal is erroneously generated from the detection circuit although the misalignment amount may be negligible or to the contrary the track misalignment signal is not generated although the optical spot is misaligned with the track center. Such problems further result in that it becomes impossible to read or write information from or to the right track or that recorded information is mistakenly erased by writing information to a wrong track.

Such problems are attenuated by embodiments of the present invention described below.

Figure 1:
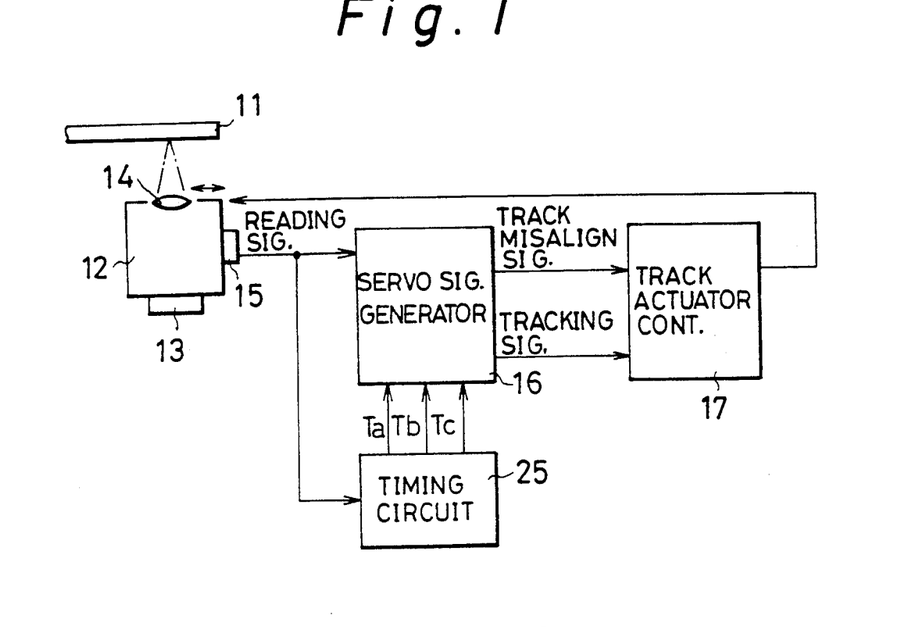
FIG. 1 is a schematic constructional diagram of an optical disk driving apparatus to which the present invention is applied.

FIG. 1 illustrates an embodiment of the present invention.

This embodiment uses an optical disk 11 which is of the sample servo type mentioned before. That is, the optical disk 11 has substantially annular (concentric circular or spiral) tracks on which a data area for recording information and a servo area for positioning or seeking the track are arranged. In the servo area, a plurality of central data servo pits B (only one pit B is illustrated in the drawing) are formed on and along the center line of the track. The center line is represented by a dash line in the drawing. Actually, the center line is a part of a circular arc of the track. In the servo area are also formed a plurality of first offset servo data pits A (only one pit A is illustrated in the drawing) and second offset servo data pits C (only one pit C is illustrated in the drawing). Each of the first and second offset servo data pits A and C is offset from the center line of the track. The first offset servo data pit A is disposed on one side of the center line of the track by a length of one fourth of the track pitch while the second offset servo data pit C is disposed on the other side of the center line of the track by the same length of one fourth of the track pitch as the first offset servo data pit A. The number of each of the servo data pits A, B and C is, for example, 1376 along one round of the track.

An optical pick up device 12 comprises a laser diode 13 disposed therein. An optical beam emitted from the laser diode 13 is converged through an optical system including an objective lens 14 to form an optical spot which is irradiated onto the optical disk 11. The optical disk 11 is rotated by a driving motor (not shown). The laser beam spot is reflected by the disk surface. The reflection rays reflected from the disk surface are guided to a photo-detector 15 through the objective lens 14 and other predetermined optical elements. The photo-detector 15 detects the reflection rays and converts the detection result to an electric signal which is output as a reading signal from the photo-detector. The reading signal is transmitted to a servo signal generator 16 which generates a tracking signal and a track misalignment signal.

A tracking actuator control circuit 17 drives and controls a tracking actuator during the time when the optical spot follows the track by using tracking signal output from the servo signal generator 16 so that the optical spot scans the track along the center thereof by shifting the objective lens 14 in the radial direction of the track in response to the servo signal. Also, the track actuator control circuit 17 checks whether the optical spot accurately follows the center of the track or not with the use of the track misalignment signal from the servo signal generator 16.

The optical pick up device 12 reads information from the optical disk 11 and writes information to the disk in the same way as the conventional apparatus.

Figure 2:
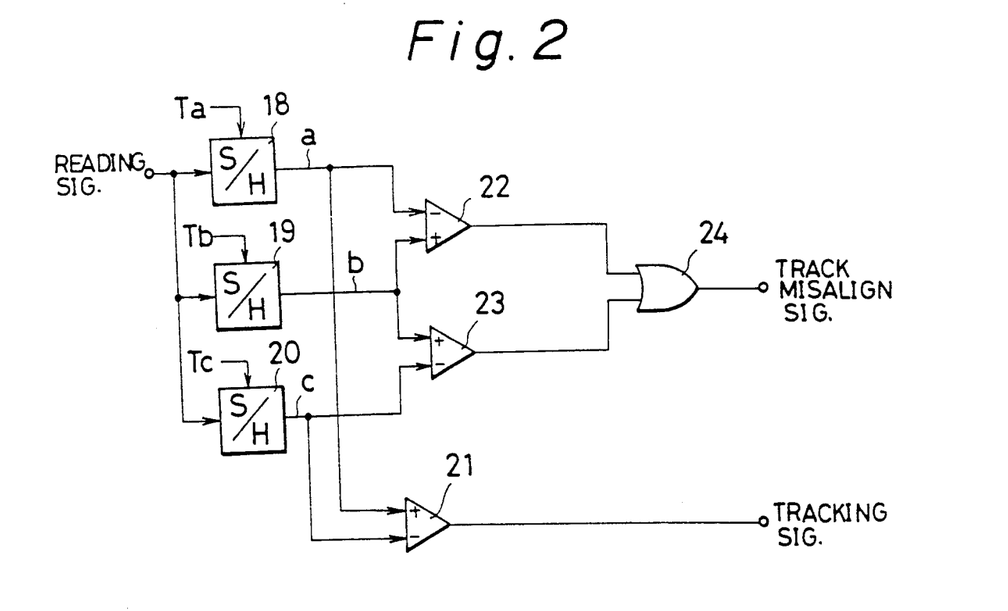
FIG. 2 is a circuit diagram of the servo signal generation means used in the driving apparatus of FIG. 1.

FIG. 2 illustrates a circuit structure of the servo signal generator 16 mentioned above.

A sample and hold circuit 18 samples the servo signal (a) corresponding to the first offset servo data pit A from the reading signal output from the photodetector 15 in accordance with a sampling timing signal Ta and holds the sample signal therein. A sample and hold circuit 19 samples the servo signal (b) corresponding to the center servo data pit B from the reading signal output from the photodetector 15 in accordance with a sampling timing signal Tb and holds the sample signal therein. Also, a sample and hold circuit 20 samples the servo signal (c) corresponding to the second offset servo data pit C from the reading signal output from the photodetector 15 in accordance with a sampling timing signal Tc and holds the sample signal therein. The sampling timing signals Ta, Tb and Tc are generated from a timing circuit 25 when the optical spot passes over the servo data pits A, B and C, respectively.

The timing circuit 25 generates the timing signals Ta, Tb and Tc by decoding the reading signals from the optical pick up device when an optical spot passes over respective servo data pits A, B and C. Such timing circuit can be constructed with a code detector, a counter and a decoder as shown in U.S. Pat. No. 4,562,564.

A subtraction circuit 21 calculates a tracking signal (a−c) by subtracting the servo signal (c) output from the sample and hold circuit 20 from the servo signal (a) output from the sample and hold circuit 18. The output level of the tracking signal (a−c) is "0" when the optical spot is positioned at the center of the track.

A first comparator 22 compares the servo signals (a) and (b) output from the sample hold circuits 18 and 19, respectively, and outputs a high level signal ("H" or "1") when the servo signal (b) is larger than (a).

A second comparator 23 compares the servo signals (b) and (c) output from the sample and hold circuits 19 and 20, respectively, and outputs a high level signal when the servo signal (b) is larger than (c).

The first and second comparators 22 and 23 are connected to an input side of an OR circuit 24 which outputs a track misalignment signal when one of the first and second comparators 22 and 23 outputs a high level signal.

Figure 3:
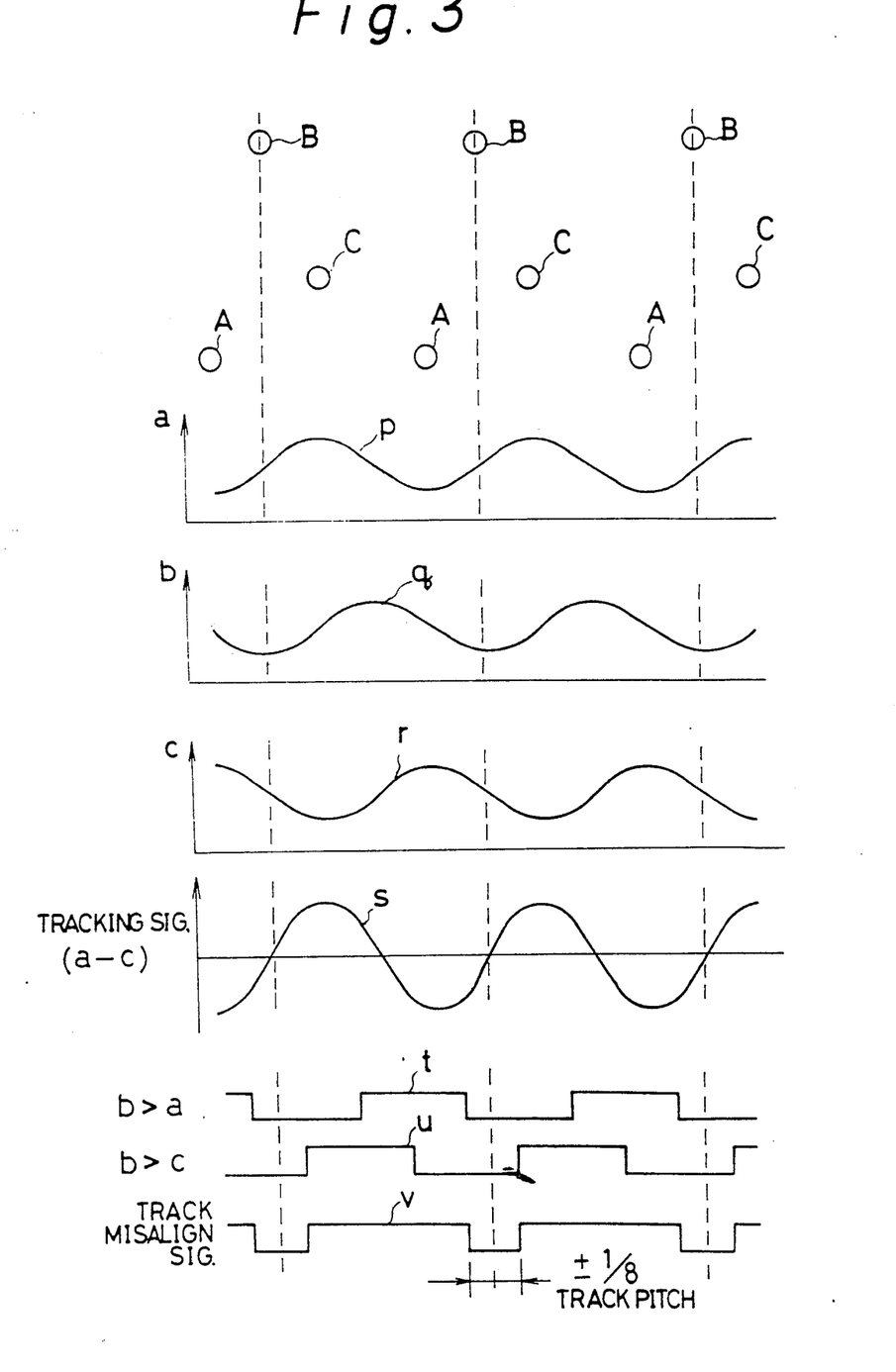
FIG. 3 is a graphical diagram representing relation between the servo data pits and signal waves from functional constituent circuits of the servo signal generation means of FIG. 1.

FIG. 3 illustrates waveforms of output signals of the constituent circuits of the servo signal generator 16. Line p represents the waveform of the servo signal (a) which has minimum extremities at the locations of the first offset servo data pit A and maximum extremities at the locations of center point between the adjacent two pits A. Line q represents the waveform of the servo signal (b) which has minimum extremities at the locations of the center servo data pit B on the center line (dash line) of the track and maximum extremities at the locations of center point between the adjacent two pits B on the track center. Line r represents the waveform of the servo signal (c) which has minimum extremities at the locations of the second offset servo data pit C and maximum extremities at the locations of center point between the adjacent two pits C.

Line s represents the output signal of the subtraction circuit 21 which outputs the tracking signal (a−c) which becomes zero at each center of the track.

Line t represents the output signal of the first comparator 22 which outputs the high level signal when the servo signal (b) is larger than (a).

Line u represents the output signal of the second comparator 23 which outputs the high level signal when the servo signal (b) is larger than (c).

Line v represents the output signal of the OR circuit 24 which outputs the track misalignment signal.

As can be seen from the graphs of FIG. 3, the output signals (lines t and u) of the first and second comparators 22 and 23 are shifted by 135 degrees and 45 degrees, respectively, with respect to the tracking signal (a−c) in the radial direction of the track (perpendicular to the dash line). The track misalignment signal (line v) is obtained from the two shifted signals (lines t and u) through the OR circuit 24 which accordingly outputs the track misalignment signal when the optical spot is offset more than $\pm\frac{1}{8}$ of the track pitch from the track center. This $\pm\frac{1}{8}$ of the track pitch is $\pm 0.1875$ μm for the track pitch of 1.5 μm widely used for optical disks. The track misalignment amount is usually within a range of $\pm 0.1$ μm in the scanning operation by the optical spot. Therefore, a critical checking range of $\pm 0.1875$ μm as mentioned above is appropriate for detecting the misalignment of the optical spot with the track center.

A situation wherein the reflection factor of the optical disk 11 changes or fluctuates is considered hereinafter with regard to the above-mentioned embodiment of the present invention.

When the reflection factor of the optical disk changes, the level of the output signals (a), (b) and (c) of the sample and hold circuits 18, 19 and 20, respectively, illustrated in FIG. 3 change accordingly in proportion to the change of the reflection factor. Therefore, the amplitude of the tracking signal (a−c) also changes. However, the phase of the tracking signal (a−c) in relation to the output signals (lines t and u) of the comparators 22 and 23 does not change since the ratio of the signal levels of the servo signals (a), (b) and (c) output from the sample and hold circuits 18, 19 and 20, respectively, remain the same.

The above-mentioned relational explanation also applies when the optical output of the laser diode 13 changes. Therefore, the checking range for detecting the track misalignment is always maintained as $\pm\frac{1}{8}$ of the track pitch, which makes it possible to reliably and stably detect the track misalignment irrespective of the fluctuation or change of the reflection factor of the optical disk or output power of the laser diode.

As mentioned above, in accordance with the embodiment of the present invention, the reading signal (a), (b) and (c) of the servo data pits A, B and C are used in such a way that the track misalignment detection signal is obtained on the basis of the output signal of the comparator 22 which compares the servo signals (b) and (a) and the output signal of the comparator 23 which compares the servo signals (b) and (c) so that the checking range for detecting the track misalignment does not change even if the reflection factor of the optical disk or the optical output of the laser diode changes. Therefore, it becomes possible to obviate the problems that the track misalignment detection signal is erroneously generated when the track misalignment is negligible or that the track misalignment is not detected when the optical spot is misaligned with the track center and that it becomes impossible to read information from or write information to the right track and that information is mistakenly erased from the track due to misalignment.

Another embodiment of the present invention which counts the number of the crossed tracks is described hereinafter.

As mentioned before with reference to FIG. 4, the sample-servo type optical disk has concentric circular or spiral tracks on which a data area for recording information and a servo area for positioning or seeking the track are arranged. In the servo area, a plurality of central data servo pits B (only one pit B is illustrated in the drawing) are formed on and along the center line of the track. The center line is represented by a dashed line in the drawing. Actually, the center line is a part of a circular arc of the track. In the servo area are also formed a plurality of first offset servo data pits A (only one pit A is illustrated in the drawing) and second offset servo data pits C (only one pit C is illustrated in the drawing). Each of the first and second offset servo data pits A and C is offset from the center line of the track. The first offset servo data pit A is disposed on one side of the center line of the track by a length of one fourth of the track pitch while the second offset servo data pit C is disposed on the other side of the center line of the track by the same length of one fourth of the track pitch as the first offset servo data pit A. The number of each of the servo data pits A, B and C is, for example, 1376 along one round of the track.

Figure 15:
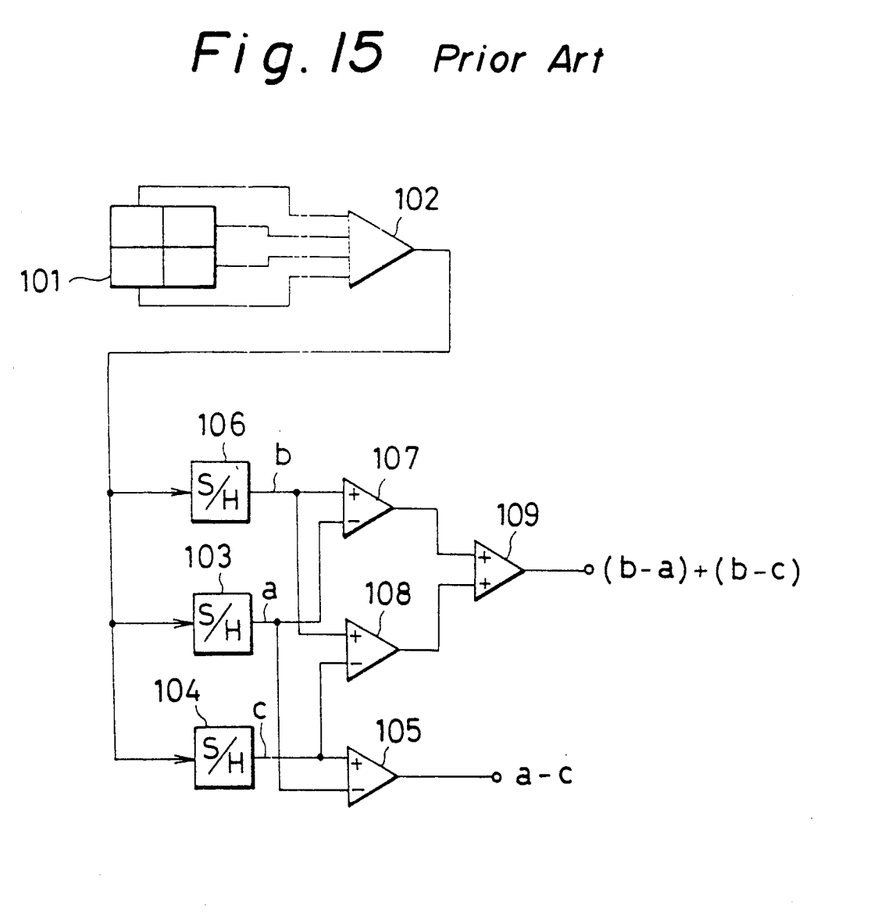
FIG. 15 is a block diagram representing a circuit construction of another example of the conventional tracking signal detection means.
Figure 16:
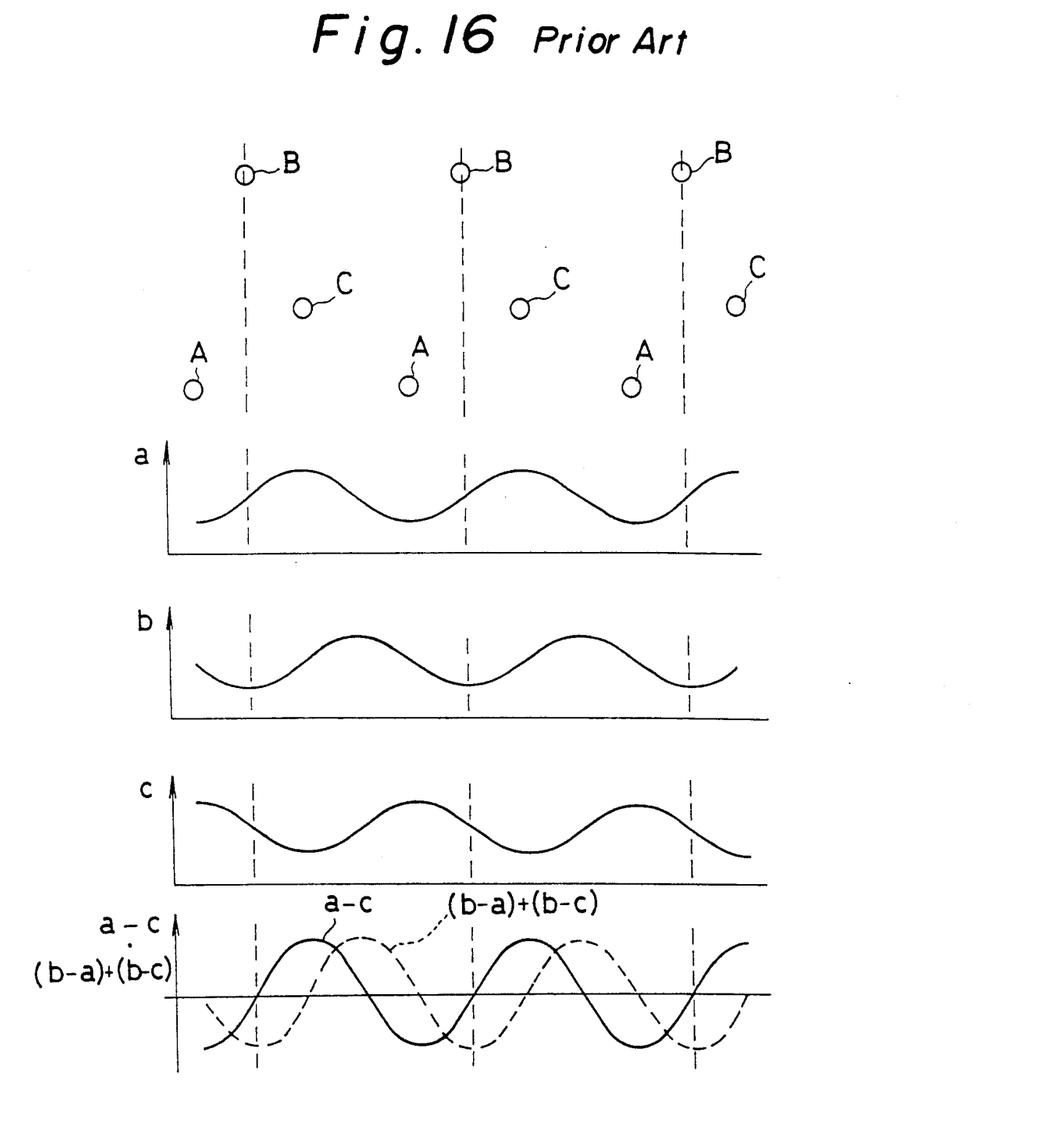
FIG. 16 is an explanatory diagram for explaining the relation between the servo data pits and the signal waves of functional constituent circuits of the conventional tracking signal detection means in relation to the location of the optical spot with respect to the track center.

FIG. 15 illustrates a circuit of a tracking signal detection means applied to the above-mentioned track structure having the servo data pits arranged thereon. The circuit comprises a quarter division optical detector 101 which divides rays reflected from the optical disk surface to four parts and detects the reflected rays of each of the four parts and an adder circuit 102 which adds the detection signal from each of the divided parts in a predetermined way to obtain a reading signal.

As mentioned before, FIG. 6 illustrates graphs of the reading signals when an optical spot such as a laser beam spot passes over the above-mentioned servo data pits A, B and C, respectively. As illustrated in the graph ② of FIG. 6, when the reading laser beam spot scans on and along the center line of the track, the levels of the reading signals (a) and (c) from the first and second offset servo data pits A and C, respectively, are the same since the distance from the spot point (on the track center) to the first pit A is the same as that from the spot point to the second pit C. Whereas, as illustrated in the graphs of ① and ③ of FIG. 6, when the reading laser beam spot scans on and along a line offset from the center line, the level of the reading signal (a) from the first offset servo data pit A is not equal to the reading signal (c) from the second offset servo data pit C, since the distance from the beam spot point to the first offset pit A is not the same as that from the beam spot point to the second offset pit C.

As illustrated in FIG. 15, the reading signal from the adder circuit 102 is transmitted to the two sample and hold circuits 103 and 104 to sample the reading signals (a) and (c) from the first and second offset servo data pits A and C, respectively. The output signals from the two sample and hold circuits 103 and 104 are transmitted to a subtracter circuit 105 to obtain a tracking signal (a−c) in response to the difference between the output signals from the two sample and hold circuits 103 and 104.

With regard to the reading signals output form the adder circuit 102, the reading signal (b) of the servo data pit B is sampled by the sample and hold circuit 106. The servo signals (a), (b) and (c) output form the sample and hold circuit 103, 104 and 106 are transmitted to a logic operator composed of logic operation circuits 107, 108 and 109. The logic operator circuit calculates to determine a signal (b−a)+(b−c) from the servo signals (a), (b) and (c). The phase of the signal (b−a)+(b−c) is shifted by 90 degrees with respect to the tracking signal (a−c). The information on crossing the tracks is obtained from signal (b−a)+(b−c) and signal (a−c).

Figure 17:
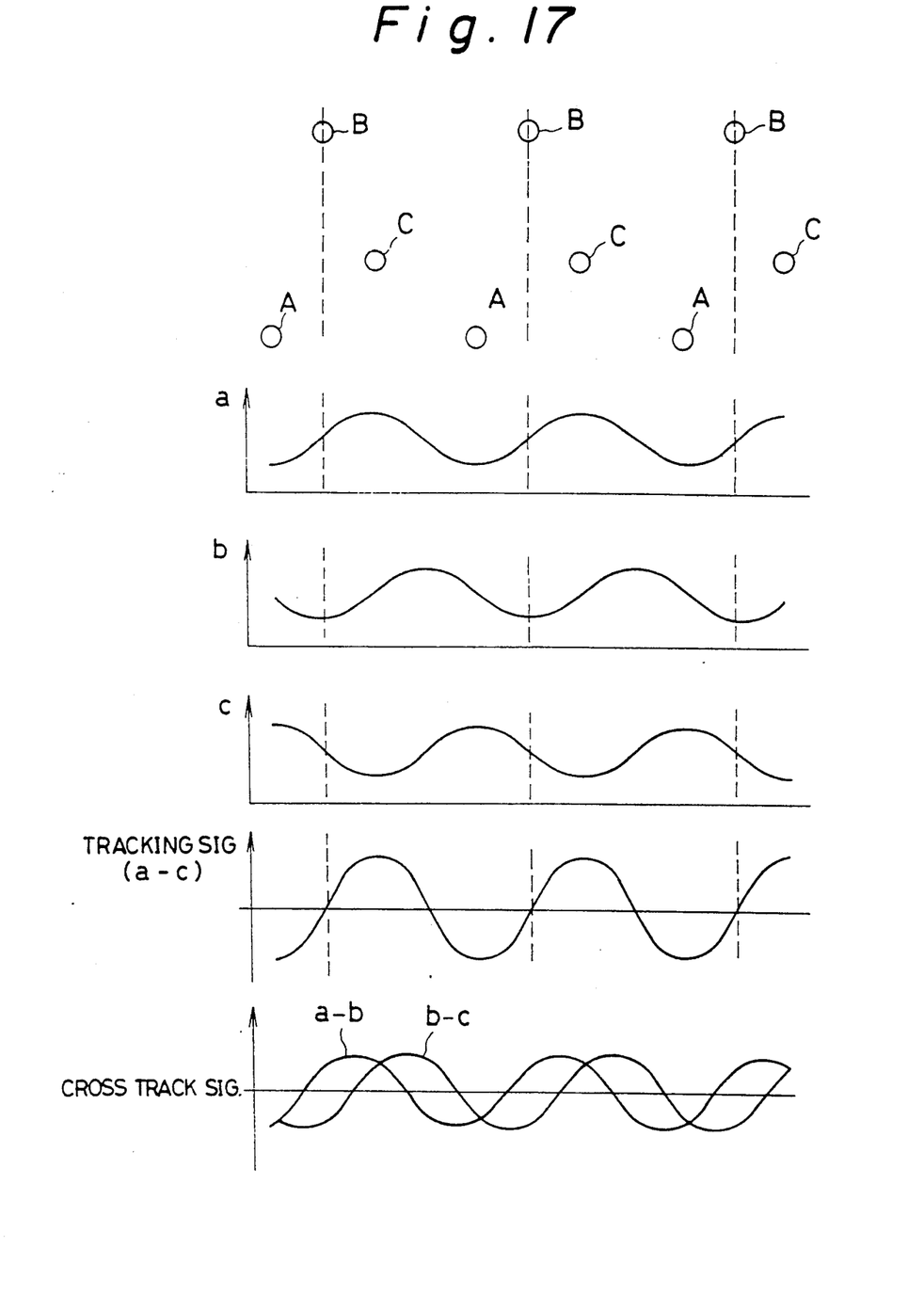
FIG. 17 is an explanatory diagram for explaining the relation between the servo data pits and the signal waves of functional constituent circuits of the tracking signal detection means in accordance with the present invention.

FIG. 17 represents graphs of signals (a), (b), (c), (a−c) and (b−a)+(b−c), respectively, in relation to the location of the optical spot in the direction perpendicular to the track line. The phase of the tracking signal (a−c) is shifted by 90 degrees from that of the signal (b−a)+(b−c). The signal (a−c) and the signal (b−a)+(b−c) are transmitted to a logic operation circuit illustrated in FIG. 12 to obtain track crossing information.

Figure 12:
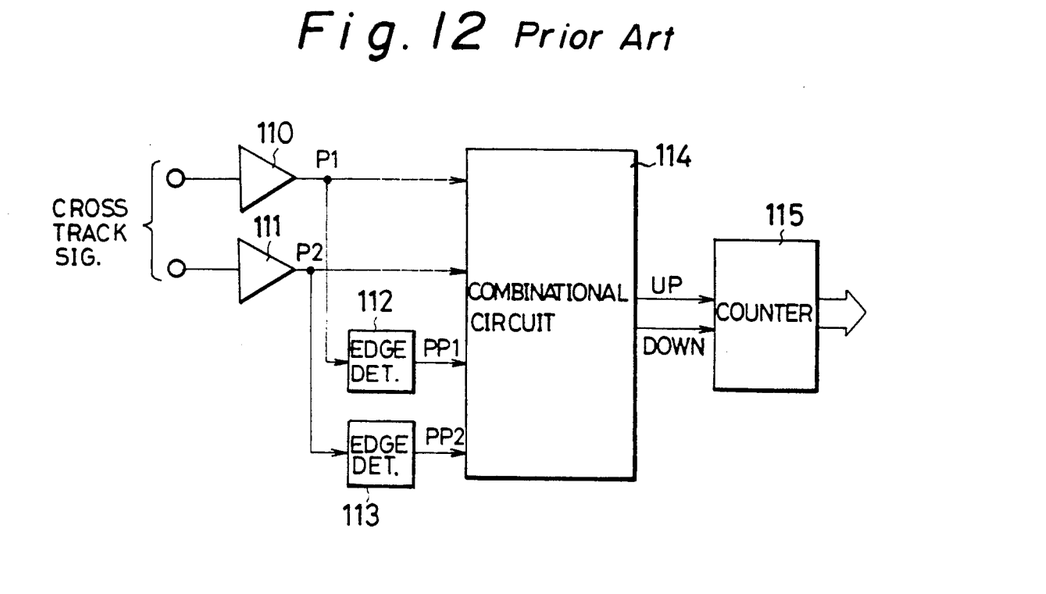
FIG. 12 is a block diagram representing an example of the cross track counter circuit in accordance with the present invention.

With reference to the operator circuit of FIG. 12, the signal (a−c) and the signal (b−a)+(b−c) are input to zero-cross comparators 110 and 111, respectively, and converted to binary signals by the reference voltage of 0 V. The binary signals are then introduced to edge detection circuits 112 and 113, respectively, which detect the rising edge and falling edge of the converted binary signals. The zero-cross comparators 110 and 111 and the edge detection circuits 112 and 113 are connected to a combinational circuit 114 which generates a pulse signal and transmits it to a counter circuit 115. The counter circuit 115 counts up or counts down the pulses from the combinational circuit 114 in response to the direction of the optical spot crossing the track discriminated from the output signals of the zero-cross comparators 110 and 111 and the edge detection circuits 112 and 113 introduced to the combinational circuit 114. For example, the combinational circuit 114 discriminates whether the output signal level of the zero-cross comparator 111 is high or low at the timing of rising (or falling) of the output signal from the other zero-cross comparator 110. In response to the discrimination result, the combinational circuit 114 operates the counter circuit 115 to count the output pulses from the edge detection circuits 112 and 113 in the count up mode or count down mode.

Figure 13:
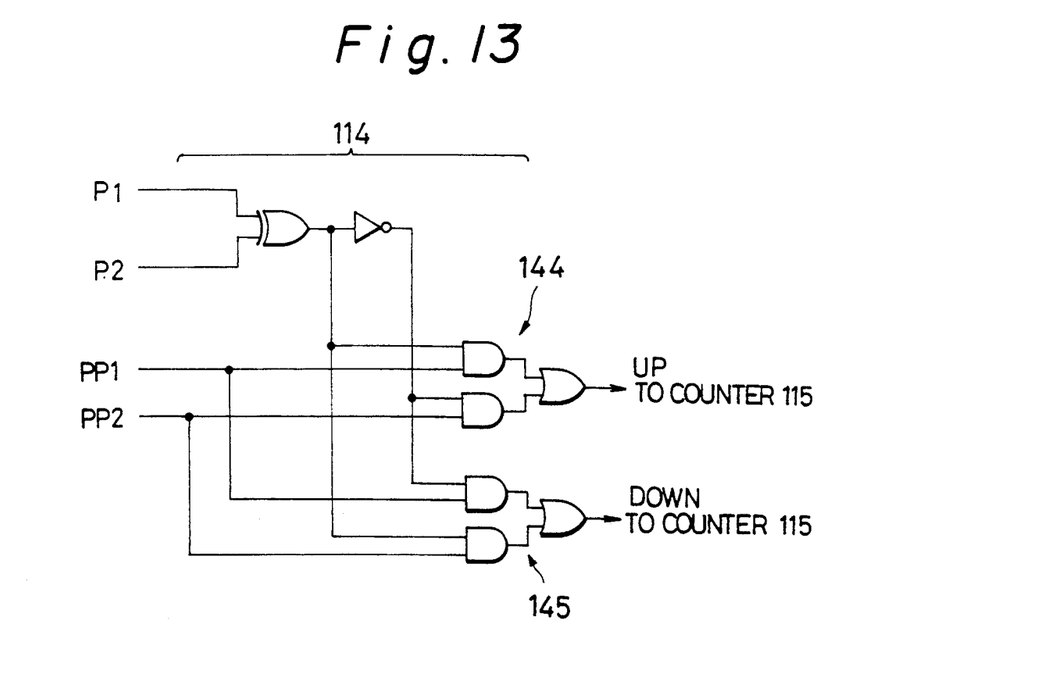
FIG. 13 is a circuit diagram representing an example of a combinational circuit shown in FIG. 12.

FIG. 13 represents a circuit diagram of one example of such combinational circuit. The combinational circuit 114 is composed of an Exclusive OR circuit 143, and the first and second pulse synthesizers 144 and 145. The exclusive OR circuit receives P1 and P2 from the comparators 110 and 111 and supplies an output signal and inverted signal thereof to each of pulse synthesizers. Each pulse synthesizer is composed of two AND circuits and one OR circuit to which the output signals of the two AND circuit is inputted. The first AND circuit receives pulses PP1 from the edge detection circuit 112 and the second one receives PP2 from the edge detection circuit 113. The output signal and inverted signal thereof from Exclusive OR circuit 143 are inputted to AND circuits in such a manner that OR circuit of the first synthesizer outputs pulses from the edge detection circuits 112 and 113 when P1 precedes P2 in phase and the OR circuit of the second synthesizer outputs pulses from the edge detection circuits 112 and 113 when P1 delays P2 in phase. The first pulse synthesizers is connected to an up pulse input of the up and down counter 115 and the second one is connected to a down pulse input of the same. Either one of the pulse synthesizers is selected in accordance with the output of the Exclusive OR circuit and the selected one supplies pulses from the edge detection circuits 112 and 113 to the connected input of the up and down counter.

Figure 11:
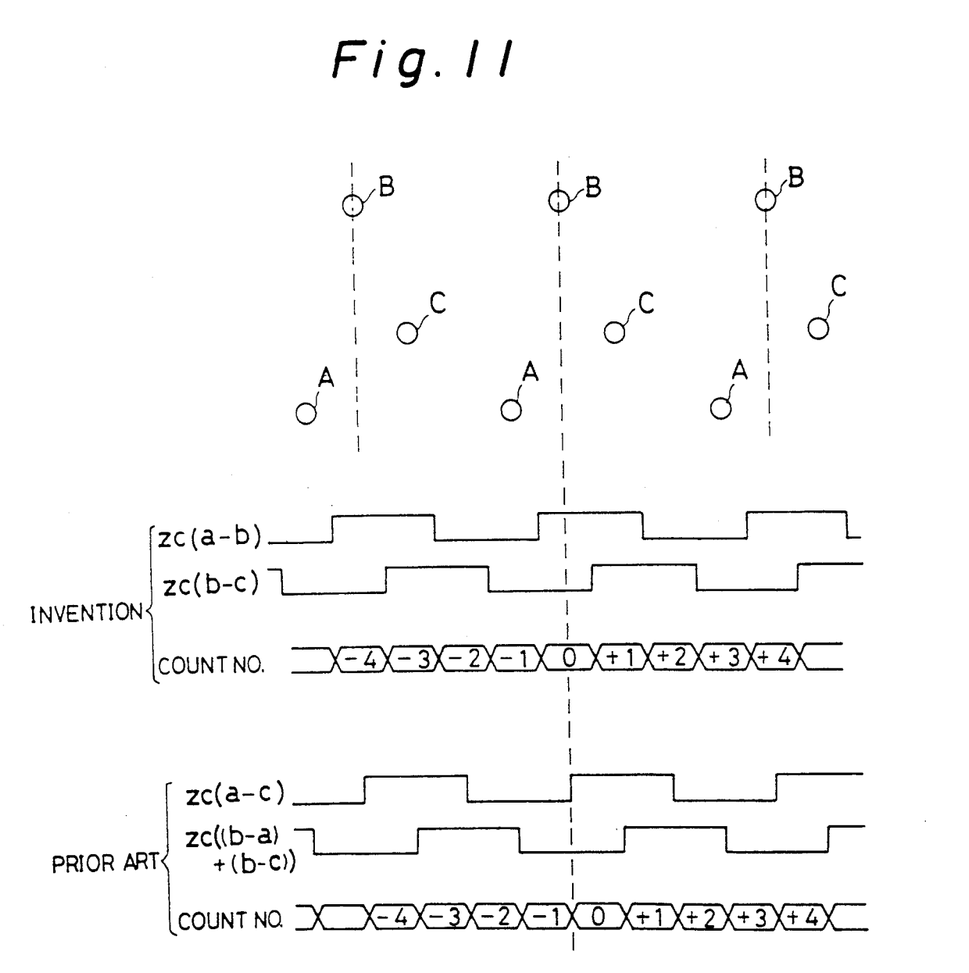
FIG. 11 is an explanatory diagram for explaining the relation between the servo data pits and the servo signals as well as the output from the cross track counter circuit for determining the location of the optical spot crossing the tracks in accordance with the present invention in comparison with the prior art.

FIG. 11 represents the output signals of the zero-cross comparators 110 and 111 and the counter circuit 115 mentioned above. In the drawing, zc(a-c) designates the output signal from the zero-cross comparator 110 to which the tracking signal (a-c) is input and zc((b-a)+(b-c)) designates the output signal from the zero-cross comparator 111 to which the signal (b-a)+(b-c) is input.

The edge detection circuits 112 and 113 are arranged in such a way that the pulse to be counted by the counter circuit 115 is generated at each of the rising and falling edges of each output signal from the two zero-cross comparators 110 and 111. By this arrangement, it becomes possible to generate four pulses each time the optical spot crosses one track so that the count number output from the counter circuit 115 is four times the number of times the optical spot crosses the tracks.

In accordance with the above-mentioned optical disk driving apparatus, the optical spot follows the track fluctuating slightly from a center line of the track towards both sides thereof during the scanning motion of the optical spot along the track. In this case, the number of times the optical spot crosses the tracks is counted by the circuit of FIG. 12 on the basis of the signal (a-c) and the signal (b-a)+(b-c). Therefore, the count number changes at the center of the track, as illustrated in FIG. 11, which causes the problem that the count number changes during normal scanning operation by the optical spot along the track, that is, in a state wherein the optical spot does not cross the track. That is, the count number changes between 0 and 1, as illustrated in FIG. 11, so that the crossing time number is erroneously detected when the optical spot does not cross the track.

An embodiment of the present invention described below obviates the above-mentioned problems and makes it possible to avoid an error in counting the number of times that the optical spot crosses the tracks, by arranging the disk driving apparatus in such a way that the cross tracking information is obtained from two cross track signals shifted by 90 degrees in phase from each other wherein the cross track count signal does not change at the time when the optical spot is located at the track center.

Figure 9:
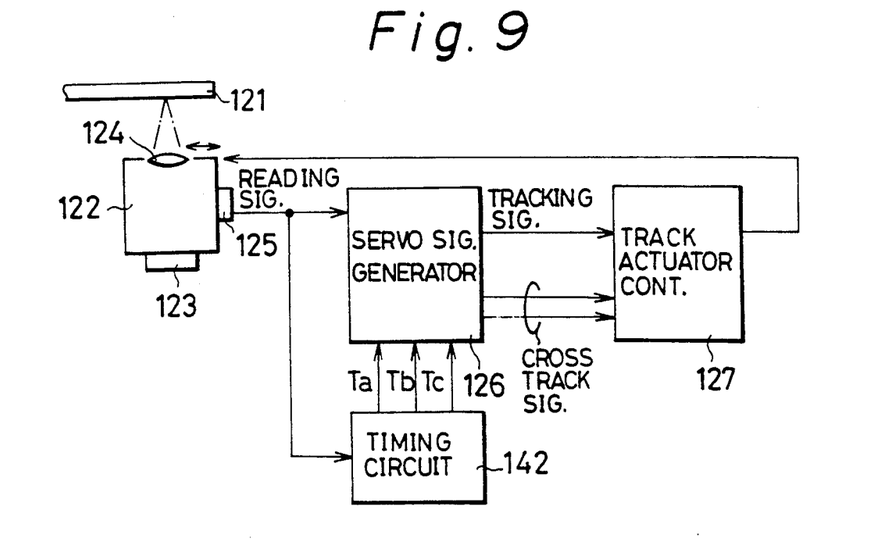
FIG. 9 is a schematic constructional diagram of another example of an optical disk driving apparatus to which the present invention is applied.

FIG. 9 illustrates an embodiment of the present invention of the type in which the number of the crossed tracks is counted. As mentioned before, an optical pick up device 122 comprises a laser diode 123 disposed therein. An optical beam emitted from the laser diode 123 is converged through an optical system including an objective lens 124 to form an optical spot which is irradiated onto the optical disk 121. The optical disk 121 is rotated by a driving motor (not shown). The laser beam spot is reflected by the disk surface. The reflection rays reflected from the disk surface are guided to a photo-detector 125 through the objective lens 124 and other predetermined optical elements. The photo-detector 125 detects the reflection rays and converts the detection result to an electric signal which is output as a reading signal from the photo-detector. The reading signal is transmitted to a servo signal generator 126 which generates a tracking signal and two cross track signals which are shifted by 90 degrees from each other.

A tracking actuator control circuit 127 drives and controls a tracking actuator when the optical spot follows the track by using a tracking signal output from the servo signal generator 126 so that the optical spot scans the track along the center thereof by shifting the objective lens 124 in the radial direction of the track in response to the servo signal.

Also, when the optical spot is to be shifted from one track to another track, the number of times that the optical spot crosses the tracks is counted with the use of the cross track signal transmitted from the servo signal generator 126 while moving the optical pick up device 122 in the radial direction of the optical disk 121 by an optical pick up actuator (not shown).

The optical pick up device 122 reads information from the optical disk 121 and writes information to the disk in the same way as the conventional apparatus.

Figure 10:
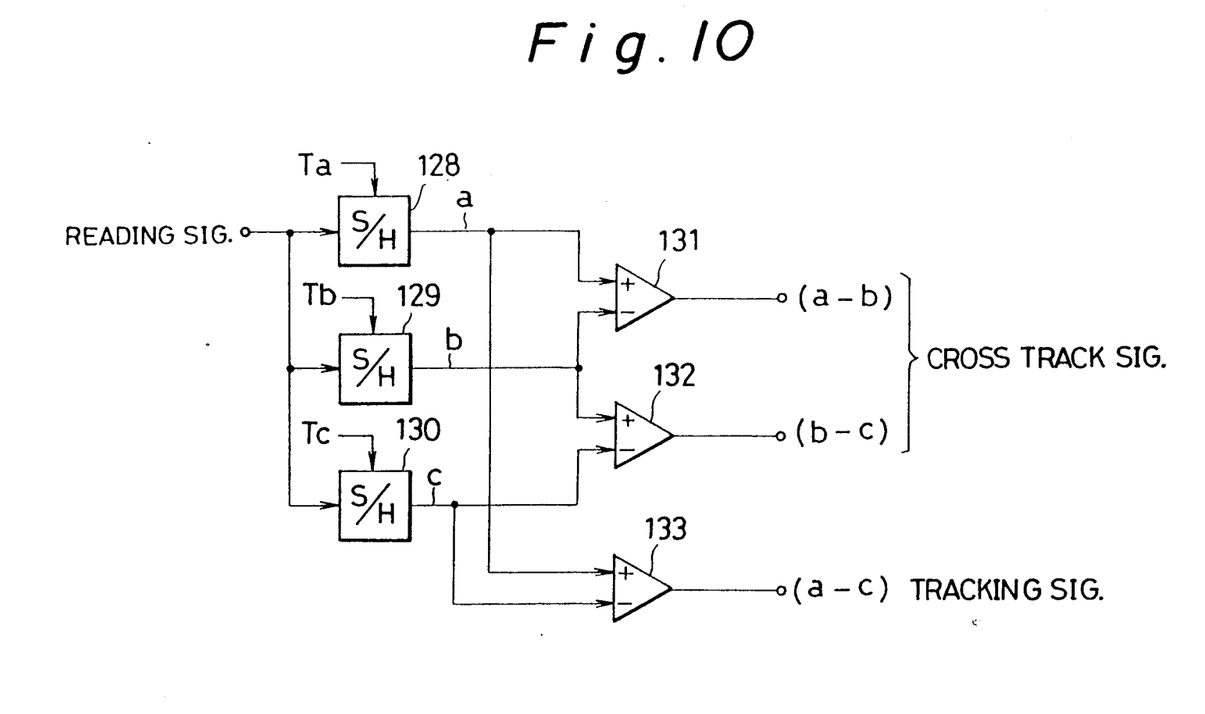
FIG. 10 is a circuit diagram representing another example of the servo signal generator means in accordance with the present invention.

FIG. 10 illustrates a circuit structure of the servo signal generator 126 mentioned above.

A sample and hold circuit 128 samples the servo signal (a) corresponding to the first offset servo data pit A from the reading signal output from the photodetector 125 in accordance with a sampling timing signal Ta and holds the sample signal therein. A sample and hold circuit 129 samples the servo signal (b) corresponding to the center servo data pit B from the reading signal output from the photodetector 125 in accordance with a sampling timing signal Tb and holds the sample signal therein. Also, a sample and hold circuit 130 samples the servo signal (c) corresponding to the second offset servo data pit C from the reading signal output from the photodetector 125 in accordance with a sampling timing signal Tc and holds the sample signal therein. The sampling timing signals Ta, Tb and Tc are generated from a timing circuit 142 at a timing when the optical spot passes over the servo data pits A, B and C, respectively.

A subtraction circuit 131 calculates a tracking signal (a-b) by subtracting the servo signal (b) output from the sample and hold circuit 129 from the servo signal (a) output from the sample and hold circuit 128.

A subtraction circuit 132 calculates a tracking signal (b-c) by subtracting the servo signal (c) output from the sample and hold circuit 130 from the servo signal (b) output from the sample and hold circuit 129.

A subtraction circuit 133 calculates a tracking signal (a-c) by subtracting the servo signal (c) output from the sample and hold circuit 130 from the servo signal (a) output from the sample and hold circuit 128.

The output level of the tracking signal (a-c) is "0" when the optical spot is positioned at the center of the track.

FIG. 17 represents graphs of signals (a), (b), (c), (a-b), (b-c) and (a-c), respectively, in relation to the location of the optical spot in the direction perpendicular to the track line.

The signal (a-c) is a tracking signal and the signals (a-b) and (b-c) are cross track signals. The phase of the cross track signal (a-b) is shifted by 90 degrees from that of the cross track signal (b-c). The cross track signals (a-b) and (b-c) are transmitted to a logic operation circuit illustrated in FIG. 12 to obtain an information on the number of tracks the optical spot crosses.

With reference to the operator circuit of FIG. 12, the cross track signal (a-b) is input to the zero-cross comparator 110 and converted to a binary signal by the reference voltage of 0 V. The binary signal is then introduced to the edge detection circuit 112 which detects the rising edge and falling edge of the converted binary signal.

The cross track signal (b-c) is input to the zero-cross comparator 111 and converted to a binary signal by the reference voltage of 0 V. The binary signal is then introduced to the edge detection circuit 113 which detects the rising edge and falling edge of the converted binary signal.

The zero-cross comparators 110 and 111 and the edge detection circuits 112 and 113 are connected to a combinational circuit 114 which generates a pulse signal and transmits it to a counter circuit 115. The counter circuit 115 counts up or counts down the pulses from the combinational circuit 114 in response to the direction of the optical spot crossing the track discriminated from the output signals of the zero-cross comparators 110 and 111 and the edge detection circuits 112 and 113 introduced to the combinational circuit 114. For example, the combinational circuit 114 discriminates whether the output signal level of the zero-cross comparator 111 is high or low at the timing of rising (or falling) of the output signal from the other zero-cross comparator 110. In response to the discrimination result, the combinational circuit 114 operates the counter circuit 115 to count the output pulses from the edge detection circuits 112 and 113 in the count up mode or count down mode.

FIG. 11 represents the output signals of the zero-cross comparators 110 and 111 and the counter circuit 115 mentioned above. In the drawing, zc (a-b) designates the output signal from the zero-cross comparator 110 to which the cross track signal (a-b) is input and zc (b-c) designates the output signal from the zero-cross comparator 111 to which the cross track signal (b-c) is input.

As can be seen from the drawing, the count number of the counter circuit 115 does not change at the center of the track as was the case of the prior art. The count number changes at the point shifted from the track center by $\pm \frac{1}{8}$ of the track pitch instead of the center of the track. The $\pm \frac{1}{8}$ of the track pitch corresponds to q0.1875 μm for the track pitch of 1.5 μm generally used for an optical disk. Usually, the following accuracy is about ±0.1 μm from the track center when the optical spot follows the track in the scanning operation for reading or writing information. Therefore, it is apparent that the count number of the counter circuit 115 does not change when the optical spot is in following the track.

In accordance with the above-mentioned embodiment of the present invention, the cross track information is obtained from the logic operator circuit of FIG. 12 using the two cross track signals (a-b) and (b-c) which are shifted by 90 degrees in phase with respect to each other. Therefore, it becomes possible to avoid miscounting of the number of tracks that the optical spot has crossed so that the access motion of the optical spot to the desired track is reliably performed.

Also, in comparison to the prior art disclosed in the aforementioned Japanese Patent Application Laying Open (KOKAI) No. 63-90035, the embodiment of the present invention mentioned above is advantageous in that the subtraction circuit 109 (FIG. 15) can be deleted without adding any circuits to the servo signal generator 126, which lowers the cost of the apparatus.

Figure 14:
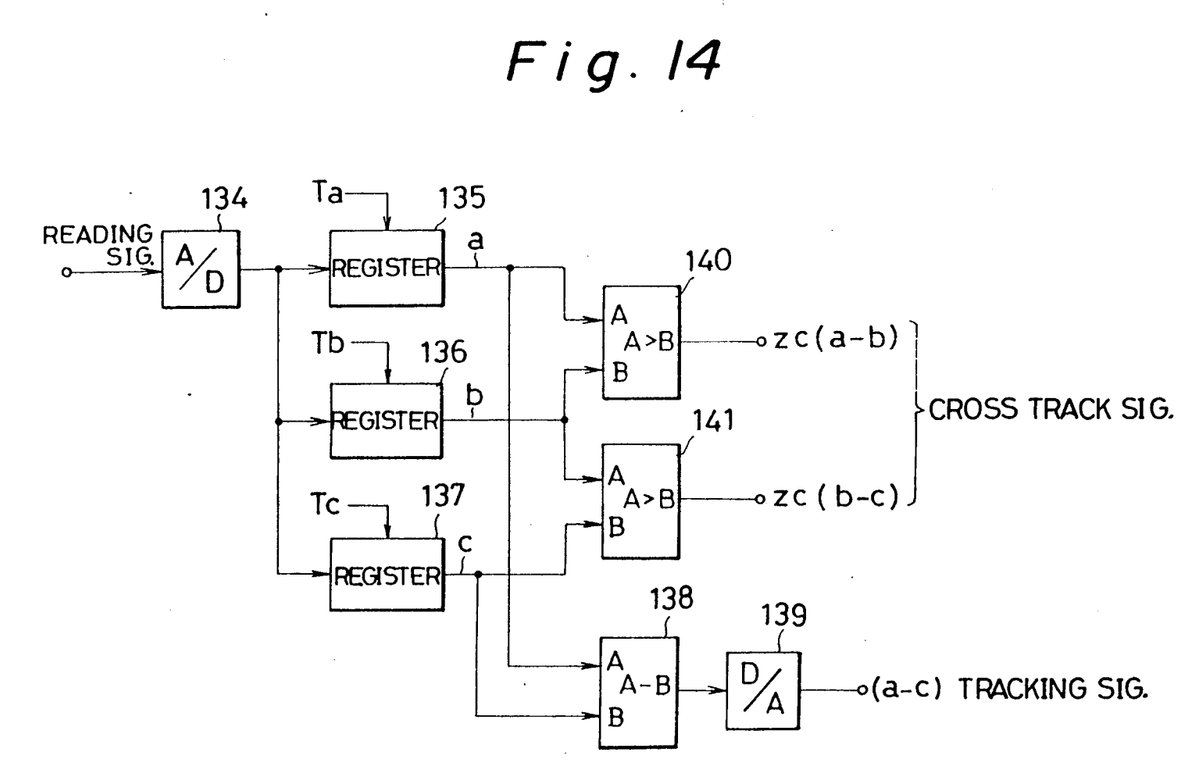
FIG. 14 is a block diagram representing another example of the servo signal generator circuit in accordance with the present invention.

FIG. 14 illustrates an example of the servo signal generator in accordance with another embodiment of the present invention. The structure of the servo signal generator used in this embodiment of the invention is described below with reference to FIG. 14.

In accordance with this servo signal generator, the reading signal transmitted from the photodetector 125 is converted to digital data in response to the signal level by an analogue/digital (A/D) converter 134. The analogue/digital converter 134 is connected to registers 135, 136 and 137, respectively, which registers latch the output signal from the analogue/digital converter 134 corresponding to the servo data pits A, B and C, respectively, in accordance with the latch timing signals Ta, Tb and Tc, respectively. The latch timing signals Ta, Tb and Tc are generated from a timing circuit (not shown) when the analogue/digital converter 134 outputs the servo signals (a), (b) and (c), respectively.

A subtracter circuit 138 calculates the tracking signal by subtracting the output data of the register 137 from the output data of the register 135. The tracking signal obtained by the subtracter circuit 138 is converted to an analogue signal by a digital/analogue (D/A) converter 139.

A first comparator 140 compares the output data from the registers 135 and 136 and outputs a cross track signal zc(a-b).

A second comparator 141 compares the output data from the registers 136 and 137 and outputs a cross track signal zc (b-c).

These cross track signals zc (a-b) and zc (b-c) are equivalent to the output signals from the zero-cross comparators 110 and 111 arranged in the circuit of FIG. 12. Therefore, the zero-cross comparators can be deleted in this embodiment of FIG. 14.

It is to be noted that when the structure of FIG. 14 is used in an optical disk driving apparatus of the so-called relative value detection type wherein the reading signal is demodulated by a signal demodulator composed of an analogue/digital converter, it becomes possible to lower the cost of the apparatus since the analogue/digital converter can be commonly used as the signal demodulator as well as the servo signal generator.

As mentioned above, in accordance with the embodiment of the present invention, it becomes possible to avoid miscounting of the number of tracks which the optical spot has crossed and reliably access a desired track since the cross track information is obtained on the basis of two cross track signals which are shifted by 90 degrees in phase with respect to each other and the cross track information does not change at the center of the track, due to the construction of an optical disk driving apparatus for driving an optical disk which comprises: a plurality of substantially annular and concentric tracks for recording information; a data area disposed in the track; a servo area disposed in the track apart from the data area; a plurality of center servo data pits disposed on and along a center of the track; a plurality of first offset servo data pits disposed on one side of the center of the track; and a plurality of second offset servo data pits disposed on the other side of the center of the track, wherein each of the first and second offset servo data pits is offset by a predetermined length away from the center of the track, wherein the apparatus comprises: a reading means for detecting the center servo data pits, the first offset servo data pits and the second offset servo data pits, respectively, by an optical spot and generating servo signals in response to detection signals of the center, first and second servo data pits, respectively; a tracking signal generating means for obtaining a tracking signal by subtraction between the servo signal for the first offset servo data pit and the servo signal for the second offset servo data pit; and a cross track signal detection means which generates a first cross track signal by subtraction between the servo signals for the center servo data pit and the first offset servo data pit and which also generates a second cross track signal by subtraction between the servo signals for the center servo data pit and the second offset servo data pit wherein the second cross track signal is shifted by about 90 degrees in phase from the first cross track signal.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical disk driving apparatus for driving an optical disk which comprises:
   a plurality of substantially annular and concentric tracks for recording information;
   a data area disposed in the track;
   a servo area disposed in the track apart from the data area;
   a plurality of center servo data pits disposed on and along a center of the track;
   a plurality of first offset servo data pits disposed on one side of the center of the track; and
   a plurality of second offset servo data pits disposed on the other side of the center of the track, wherein each of the first and second offset servo data pits is offset by a predetermined length away from the center of the track,
   wherein the apparatus comprises:
   a reading means for detecting the center servo data pits, the first offset servo data pits and the second offset servo data pits, respectively, by an optical spot and generating servo signals in response to detection signals of the center, first and second servo data pits, respectively;
   a tracking signal generating means for generating a tracking signal by subtraction between the servo signals for the first offset servo data pit and for the second offset servo data pit;
   a first comparison means for comparing the servo signal for the center servo data pit with the servo signal for the first offset servo data pit;
   a second comparison means for comparing the servo signal for the center servo data pit with the servo signal for the second offset servo data pit; and
   a track misalignment detection means for detecting the misalignment of the optical spot with the center of the track in accordance with outputs from the first and second comparison means, said track misalignment detection means including a logic means connected to said first and second comparison means to obtain a track misalignment detection signal representative of misalignment of the optical spot with the center of the track when the servo signal for the center servo data pit is larger than at least one of the servo signals for first and second offset servo data pits.

2. An optical disk driving apparatus according to claim 1, wherein said predetermined length is about one fourth of a track pitch of said optical disk.

3. An optical disk driving apparatus according to claim 1, wherein said first and second comparison means similarly output one of high and low level signals when the servo signal for the center servo data pit is larger than those for the first and second offset servo data pits.

4. An optical disk driving apparatus according to claim 3, wherein said logic means is an OR circuit, and said first and second comparison means are connected to said OR circuit to obtain the track misalignment detection signal when one of the comparison means outputs a high level signal.

5. An optical disk driving apparatus for driving an optical disk which comprises:
   a plurality of substantially annular and concentric tracks for recording information;
   a data area disposed in the track;
   a servo area disposed in the track apart from the data area;
   a plurality of center servo data pits disposed on and along a center of the track;
   a plurality of first offset servo data pits disposed on one side of the center of the track; and
   a plurality of second offset servo data pits disposed on the other side of the center of the track, wherein each of the first and second offset servo data pits is offset by a predetermined length away from the center of the track,
   wherein the apparatus comprises:
   a reading means for detecting the center servo data pits, the first offset servo data pits and the second offset servo data pits, respectively, by an optical spot and generating servo signals in response to detection signals of the center, first and second servo data pits, respectively;
   a tracking signal generating means for obtaining a tracking signal by subtraction between the servo signal for the first offset servo data pit and the servo signal for the second offset servo data pit; and
   a cross track signal generating means for generating a first cross track signal by subtraction between the servo signals for the center servo data pit and the first offset servo data pit and generating a second cross track signal by subtraction between the servo signals for the center servo data pit and the second offset servo data pit, the second cross track signal being shifted by about 90 degrees in phase from the first cross track signal;
   counting means responsive to said first and second cross track signals for counting number of crossed tracks, wherein
   said first and second cross track signals maintain their levels at the center of a track to insure accuracy of counted number of the crossed tracks.

6. An optical disk driving apparatus according to claim 5, wherein said predetermined length is about one fourth of a track pitch of the optical disk.

7. An optical disk driving apparatus according to claim 5, wherein said counting means includes converter for converting each of said first and second cross track signals to a binary signal.

8. An optical disk driving apparatus according to claim 7, wherein said counting means includes edge detector for detecting edges of the binary signal, and counter connected to said edge detector for counting edges of the output signal from the edge detector.

* * * * *